(12) United States Patent
Nakagawa

(10) Patent No.: US 11,351,932 B1
(45) Date of Patent: Jun. 7, 2022

(54) VEHICLES AND METHODS FOR GENERATING AND DISPLAYING COMPOSITE IMAGES

(71) Applicant: TOYOTA MOTOR ENGINEERING & MANUFACTURING NORTH AMERICA, INC., Plano, TX (US)

(72) Inventor: Masashi Nakagawa, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/155,774

(22) Filed: Jan. 22, 2021

(51) Int. Cl.
*B60R 11/04* (2006.01)

(52) U.S. Cl.
CPC ......... *B60R 11/04* (2013.01); *B60R 2300/105* (2013.01); *B60R 2300/303* (2013.01); *B60R 2300/607* (2013.01)

(58) Field of Classification Search
None
See application file for complete search history.

(56) References Cited

U.S. PATENT DOCUMENTS

| | | | | |
|---|---|---|---|---|
| 8,593,519 | B2 * | 11/2013 | Tauchi | G01S 17/931 348/148 |
| 10,723,266 | B2 | 7/2020 | Mori et al. | |
| 2009/0140881 | A1 * | 6/2009 | Sakai | B60R 1/00 340/901 |
| 2009/0231432 | A1 * | 9/2009 | Grigsy | G08G 1/161 348/149 |
| 2016/0332574 | A1 * | 11/2016 | Park | G06T 3/0062 |
| 2019/0001968 | A1 | 1/2019 | Yorifuji et al. | |

(Continued)

FOREIGN PATENT DOCUMENTS

| | | |
|---|---|---|
| CN | 111508260 A | 8/2020 |
| EP | 1302076 B1 | 5/2008 |

(Continued)

OTHER PUBLICATIONS

Yu-Chih Liu et al.; "Bird's-Eye View Vision System for Vehicle Surrounding Monitoring"; (https://link.springer.com/chapter/10.1007%2F978-3-540-78157-8_16); 2008; 4 pgs.

(Continued)

*Primary Examiner* — Rebecca A Volentine
(74) *Attorney, Agent, or Firm* — Dinsmore & Shohl LLP

(57) ABSTRACT

A vehicle and methods for generating and displaying a composite image is provided. The method includes receiving a first image from a first image capture component external to the vehicle and a second image from a second image capture component that is external to the vehicle, generating a composite image using the first image and the second image, the first image is associated with a first perspective view of the vehicle and the second image is associated with a second perspective view of the vehicle, and outputting the composite image on a display of the vehicle. The method also includes making a selection at least one of the first image capture component and the second image capture component, and outputting one or more images from the selected image capture component on the display of the vehicle in response to receiving the selection.

18 Claims, 7 Drawing Sheets

(56) References Cited

U.S. PATENT DOCUMENTS

2019/0122540 A1* 4/2019 Ishikawa .................. B60R 1/00
2020/0257917 A1* 8/2020 Moore .................. H04N 7/188

FOREIGN PATENT DOCUMENTS

| EP | 2447925 A1 | 5/2012 |
| JP | 5715778 B2 | 3/2015 |
| WO | 2011135778 A1 | 11/2011 |

OTHER PUBLICATIONS

"Monitor Provides a Virtual 360-Degree Scene of the Car in Bird's-Eye View"; (https://www.nissan-global.com/EN/TECHNOLOGY/OVERVIEW/avm.html); Sep. 29, 2020; 2 pgs.
European Extented Search Report from corresponding EP Application No. 22152792.2 dated Apr. 4, 2022; 13 pgs.

* cited by examiner

VEHICLES AND METHODS FOR GENERATING AND DISPLAYING COMPOSITE IMAGES

TECHNICAL FIELD

The embodiments described herein generally relate to generating and outputting a composite image on a display of a vehicle, and more specifically, to generating and outputting a composite image by combining images illustrating various perspectives of the vehicle that are received from external image capture components.

BACKGROUND

Conventional vehicle systems of vehicles may include one or more image capture components that are installed as part of these vehicles and utilized to capture images of the areas surrounding these vehicles. The captured images may then be output on respective displays of these vehicles. However, conventional vehicles lack the functionality to leverage the functionalities of image capturing devices that are external to these vehicles in order to generate and display certain types of composite images.

Accordingly, a need exists for a vehicle system that effectively leverages the functionalities and capabilities of external image capturing devices to generate and display certain types of composite images.

SUMMARY

In one embodiment, a vehicle that is configured to generate and display composite images is provided. The vehicle includes a processor that is configured to receive a first image from a first image capture component and a second image from a second image capture component, the first image capture component and the second image capture component being external to the vehicle, generate a composite image using the first image and the second image, the first image illustrating a first perspective view of the vehicle and the second image illustrating a second perspective view of the vehicle, and output the composite image on a display of the vehicle.

In another embodiment, a method for generating and displaying composite images are provided. The method includes receiving a first image from a first image capture component external to the vehicle and a second image from a second image capture component that is external to the vehicle, generating a composite image using the first image and the second image, the first image illustrating a first perspective view of the vehicle and the second image illustrating a second perspective view of the vehicle, and outputting the composite image on a display of the vehicle.

In yet another embodiment, a system for generating and displaying composite images is provided. The system includes first image capture component that is external to a vehicle, a second image capture component that is external to the vehicle, and a processor. The processor is configured to receive a first image from the first image capture component a second image from the second image capture component, generate a composite image using the first image and the second image, the first image illustrating a first perspective view of the vehicle and the second image illustrating a second perspective view of the vehicle, and output the composite image on a display of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein describe methods and systems for generating and outputting composite images on a display of a vehicle. For example, the system for generating and outputting composite images may include a composite image generating system included as part of vehicle that is configured to receive images from various image capture components that are external to the vehicle, generate a composite image using the received images, and output the composite image on a display of the vehicle. In embodiments, the generation and outputting of the composite image may occur in real time.

Unlike conventional systems, the vehicle system as described in the current disclosure enables the vehicle to leverage the functionalities of external image capture devices to generate and display images certain types of images, namely images that illustrate a bird's eye perspective of the vehicle. In embodiments, such perspectives enable for the accurate and effective determination of one or more blind spots near vehicles, which facilitates avoidance of vehicle accidents.

Figure 1:
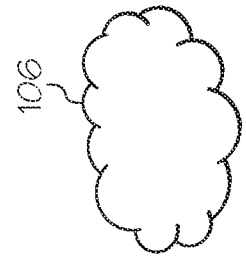
FIG. 1 schematically depicts an example operating environment of a composite image generating system for generating and outputting composite images as described in the present disclosure, according to one or more embodiments described and illustrated herein.
Figure 1:
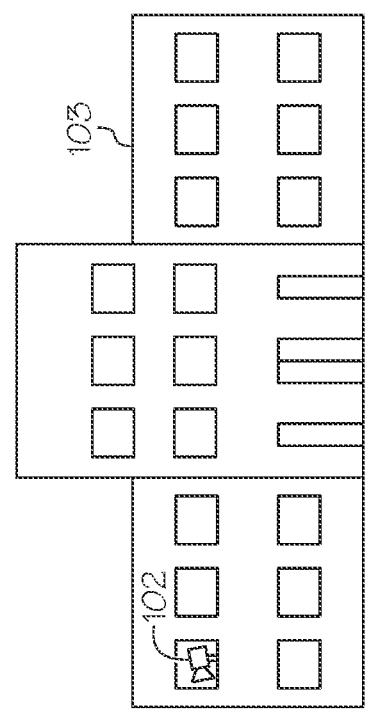
Figure 1:
Figure 1:
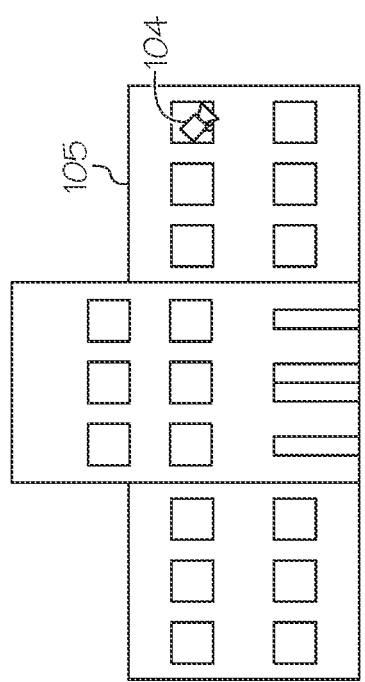
Figure 1:
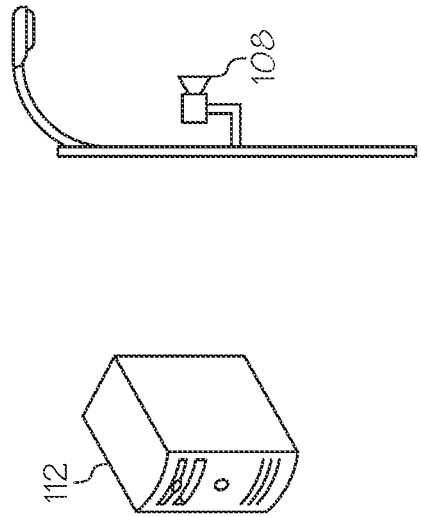
Figure 1:
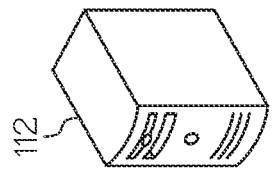

Referring now to the drawings, FIG. 1 schematically depicts an example operating environment of a composite image generating system for generating and outputting composite images as described in the present disclosure, according to one or more embodiments described and illustrated herein.

Specifically, FIG. 1 depicts a vehicle 100 that may be parked on the side of a street near image capture components 102, 104, 108, which may configured to communicate with the vehicle 100 via a communication network 106. Specifically, in embodiments, the image capture components 102, 104, 108 may capture one or more images of the vehicle 100 from various angles, positions, orientations, and so forth, and transmit these images to a vehicle system 200 (depicted in FIG. 2) of the vehicle 100 in real time. These image capture components may be installed in buildings 103, 105, and as part of street light, as depicted in FIG. 1. The vehicle system 200 of the vehicle 100, may analyze the content of the images, determine variations amongst these images, and selectively combine one or more of the received images to generate a composite image. For example, in embodiments, the vehicle system 200 may determine an angle from which a particular image of the vehicle 100 was captured, the distance from which an image may have been captured, and compare this data with one or more threshold values. Thereafter, if an angle associated an image is below a threshold value of another angle associated with another image, the vehicle system may not combine the two images.

Figure 6:
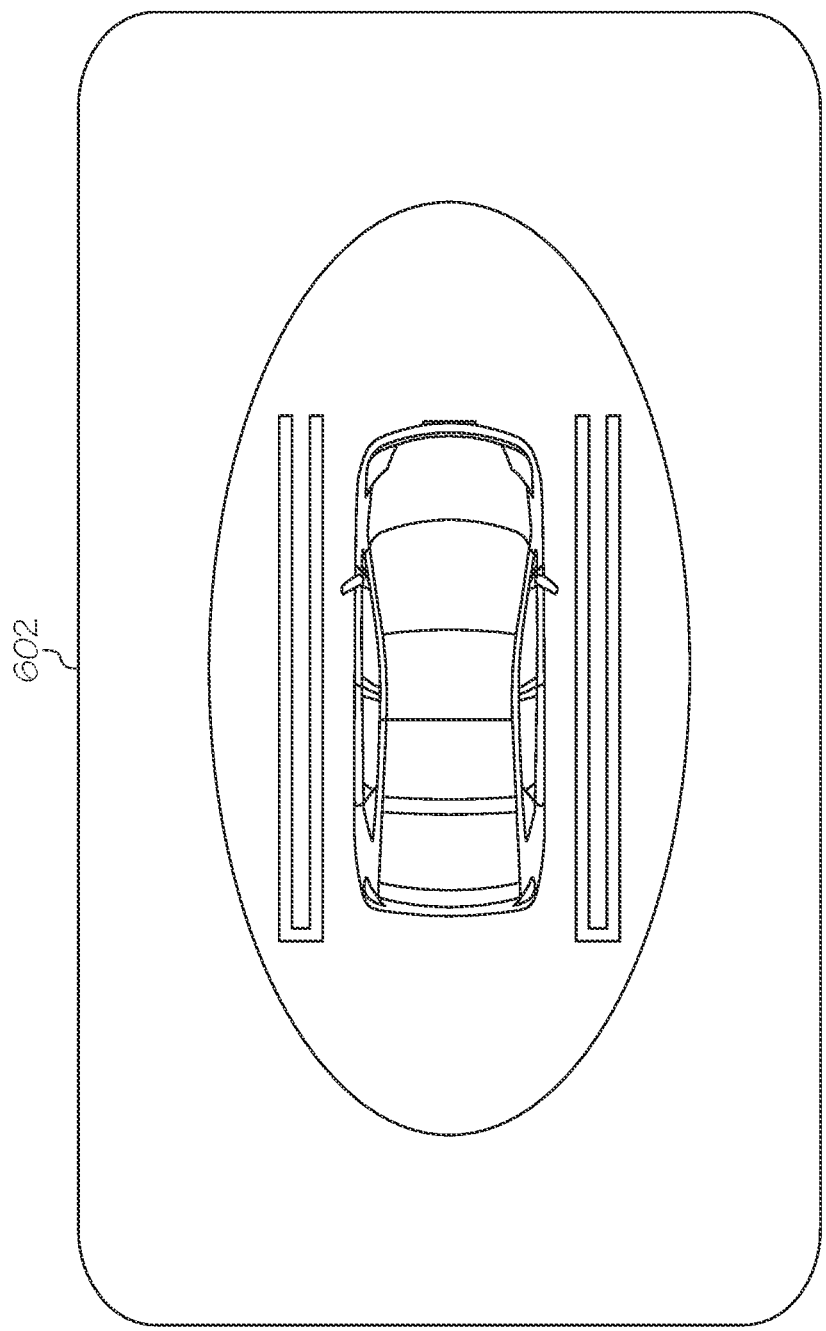
FIG. 6 depicts examples of composite images that may be generated by the processor, according to one or more embodiments described and illustrated herein.

Alternatively, if an angle associated with an image is above a threshold value of another angle of another image, the vehicle system 200 may determine that there is sufficient variation between these images. Consequently, the vehicle system 200 may combine these images to generate a composite image. The angles of a plurality of images, each illustrating different perspectives of the vehicle 100, may be compared. Based on the comparison, multiple images may be combined. In embodiments, the composite image may be a bird's eye view of the vehicle 100, e.g., an image that includes a perspective view of the vehicle 100 from a certain distance above the topmost portion of the vehicle 100, as depicted in FIG. 6 of this disclosure. Such an image enables vehicle operators to access and view one or more objects within a certain proximity of the vehicle 100, namely areas within a certain radius of the vehicle 100 such that any blind-spots in and around the vehicle 100 are identified. In this way, the likelihood of collisions between the vehicle 100 and other vehicles may be avoided. For example, in situations where the owner of the vehicle 100 drives into a street from a parking spot on the side of the street, the owner will be more aware of vehicles that travel adjacent to and through one or more blind spots of the vehicle 100.

In embodiments, the composite image may be output onto a display of the vehicle 100 in real time. Additionally, each image that is received from an external image capture component may be output onto the display of the vehicle 100, e.g., based on a user of the vehicle selecting a particular external image capture component with which the vehicle system 200 has established a connection. In this way, the vehicle system 200 may enable a user to calibrate operation of the vehicle 100 such that images from a particular image capture component may be accessed and output on a display of the vehicle 100.

Figure 2:
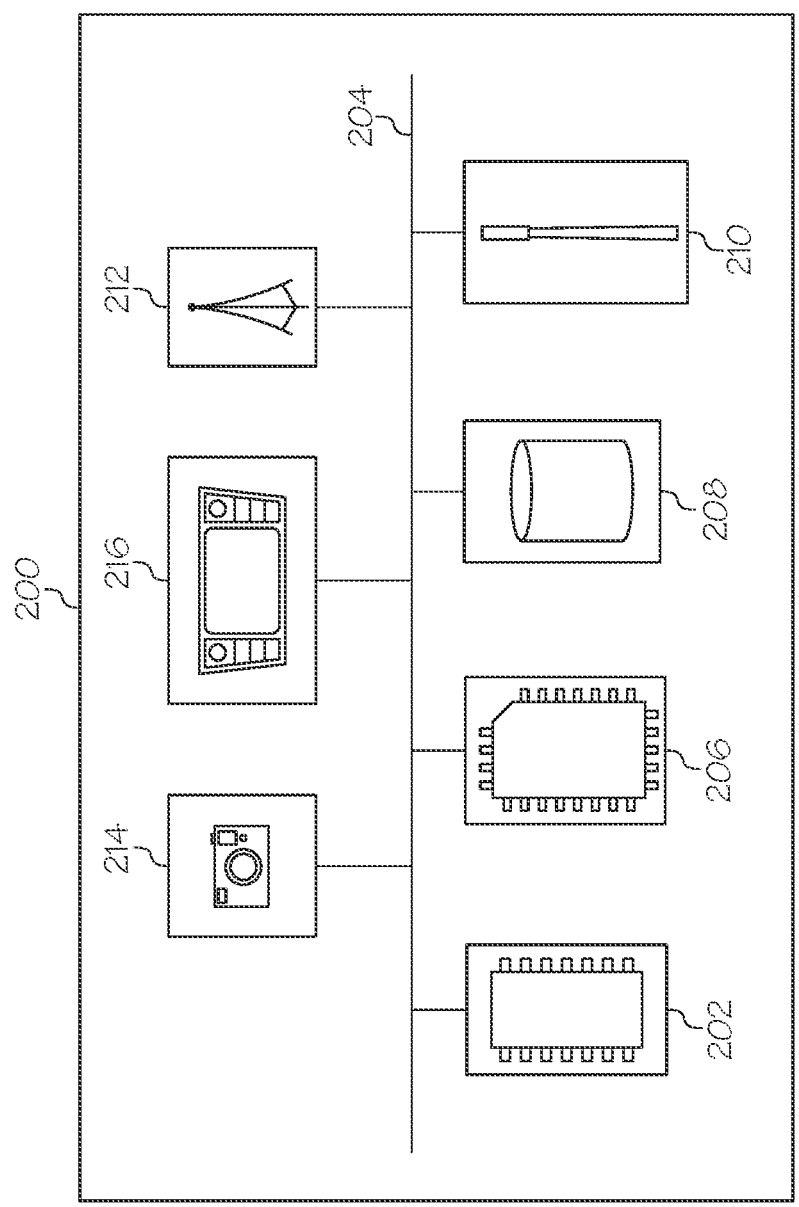
FIG. 2 schematically depicts non-limiting components of a composite image generating system, according to one or more embodiments shown herein.

FIG. 2 schematically depicts non-limiting components of a composite image generating system as part of a vehicle system 200, according to one or more embodiments shown herein. Notably, while the vehicle system 200 is depicted in isolation in FIG. 2, the vehicle system 200 may be included within a vehicle. For example, the vehicle system 200 may be included within the vehicle 100. The vehicle 100 may be an automobile or any other passenger or non-passenger vehicle such as, for example, a terrestrial, aquatic, and/or airborne vehicle. In some embodiments, these vehicles may be autonomous vehicles that navigate their environments with limited human input or without human input.

The vehicle system 200 includes a processor 202. The processor 202 may be any device capable of executing machine readable and executable instructions. Accordingly, the processor 202 may be a controller, an integrated circuit, a microchip, a computer, or any other computing device. The processor 202 is coupled to a communication path 204 that provides signal interconnectivity between various modules of the system. Accordingly, the communication path 204 may communicatively couple any number of processors (e.g., comparable to the processor 202) with one another, and allow the modules coupled to the communication path 204 to operate in a distributed computing environment. Specifically, each of the modules may operate as a node that may send and/or receive data. As used herein, the term "communicatively coupled" means that the coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 also includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the processor 202. The machine readable and executable instructions may comprise logic or algorithm(s) written in any programming language of any generation (e.g., 1GL, 2GL, 3GL, 4GL, or 5GL) such as, for example, machine language that may be directly executed by the processor 202, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In some embodiments, the one or more memory modules 206 may store data related to status and operating condition information related to one or more vehicle components, e.g., brakes, airbags, cruise control, electric power steering, battery condition, and so forth.

The vehicle system 200 may include one or more sensors 208. Each of the one or more sensors 208 is coupled to the communication path 204 and communicatively coupled to the processor 202. The one or more sensors 208 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the vehicle system 200 optionally includes a satellite antenna 210 coupled to the communication path 204 such that the communication path 204 communicatively couples the satellite antenna 210 to other modules of the vehicle system 200. The satellite antenna 210 is configured to receive signals from global positioning system satellites. Specifically, in one embodiment, the satellite antenna 210 includes one or more conductive elements that interact with electromagnetic signals transmitted by global positioning system satellites. The received signal is transformed into a data signal indicative of the location (e.g., latitude and longitude) of the satellite antenna 210 or an object positioned near the satellite antenna 210, by the processor 202.

The vehicle system 200 may include the network interface hardware 212 for communicatively coupling the vehicle system 200 with a server 112, e.g., via communication network 106. The network interface hardware 212 is coupled to the communication path 204 such that the communication path 204 communicatively couples the network interface hardware 212 to other modules of the vehicle system 200. The network interface hardware 212 may be any device capable of transmitting and/or receiving data via a wireless network. Accordingly, the network interface hardware 212 may include a communication transceiver for sending and/or receiving data according to any wireless communication standard. For example, the network interface hardware 212 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 212 includes a Bluetooth transceiver that enables the vehicle system 200 to exchange information with the server 112 via Bluetooth communication.

The network interface hardware 212 may utilize various communication protocols to establish a connection between the vehicle system 200 a vehicle and one or more image capture components that are external to the vehicle. For example, in embodiments, the network interface hardware 212 may utilize a communication protocol that enables communication between a vehicle and various other devices, e.g., vehicle-to-everything (V2X). Additionally, in other embodiments, the network interface hardware 212 may utilize a communication protocol that is dedicated for short range communications (DSRC). Compatibility with other comparable communication protocols are also contemplated.

It is noted that communication protocols include multiple layers as defined by the Open Systems Interconnection Model (OSI model), which defines a telecommunication protocol as having multiple layers, e.g., Application layer, Presentation layer, Session layer, Transport layer, Network layer, Data link layer, and Physical layer. To function correctly, each communication protocol includes a top layer protocol and one or more bottom layer protocols. Examples of top layer protocols (e.g., application layer protocols) include HTTP, HTTP2 (SPDY), and HTTP3 (QUIC), which are appropriate for transmitting and exchanging data in general formats. Application layer protocols such as RTP and RTCP may be appropriate for various real time communications such as, e.g., telephony and messaging. Additionally, SSH and SFTP may be appropriate for secure maintenance, MQTT and AMQP may be appropriate for status notification and wakeup trigger, and MPEG-DASH/HLS may be appropriate for live video streaming with user-end systems. Examples of transport layer protocols that are selected by the various application layer protocols listed above include, e.g., TCP, QUIC/SPDY, SCTP, DCCP, UDP, and RUDP.

The vehicle system 200 includes a camera 214, which provides signal interconnectivity between various components of the vehicle system 200. The camera may have any resolution. In some embodiments, one or more optical components, such as a mirror, fish-eye lens, or any other type of lens may be optically coupled to the camera. In embodiments, the camera may have a broad angle feature that enables capturing digital content within a 150 degree to 180 degree arc range. Alternatively, the camera may have a narrow angle feature that enables capturing digital content within a narrow arc range, e.g., 60 degree to 90 degree arc range. In embodiments, the one or more cameras may be capable of capturing high definition images in a 720 pixel resolution, a 1080 pixel resolution, and so forth. Alternatively or additionally, the camera may have the functionality to capture a continuous real time video stream for a predetermined time period. It is also noted that the image capture components 102 and 104 are cameras having features and functionalities comparable to the camera 214. In embodiments, the image capture components 102, 104 may be cameras that are a part of a Closed Circuit Television (CCTV) Network. Alternatively, each of these cameras may be independent from each other and be capable of transmitting images or a live video stream to various vehicles.

The vehicle system 200 includes a display 216 for providing visual output such as, for example, images of vehicles (or other others) within an environment, a live video stream of vehicles (or other others) within an environment, maps, navigation, entertainment, or a combination thereof. The display 216 may output images of vehicles (or other others), a live video stream of vehicles, maps, navigation, entertainment, or a combination thereof, map, navigation, and entertainment. The display 216 is coupled to the communication path 204. Accordingly, the communication path 204 communicatively couples the display 216 to other modules of the vehicle system 200 including, without limitation, the processor 202 and/or the one or more memory modules 206. In embodiments, the display 216 may display the data related to environmental conditions and traffic conditions that are received from one or more external devices, e.g., traffic cones and/or vehicles.

Figure 3:
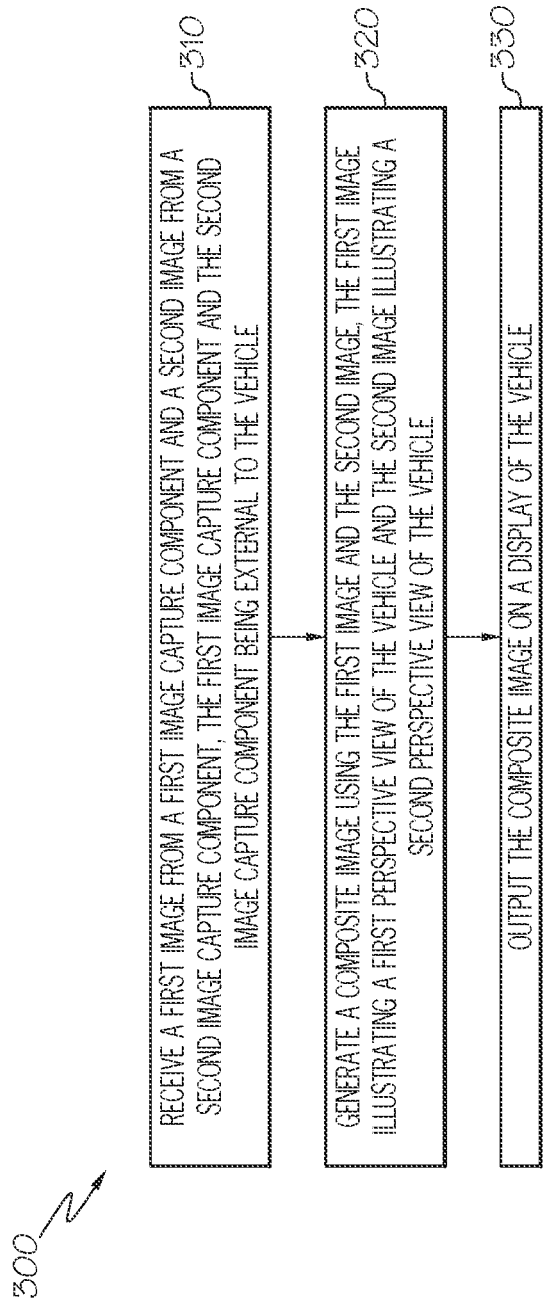
FIG. 3 depicts a flow chart for generating and outputting a composite image on a display of a vehicle, according to one or more embodiments described and illustrated herein.

FIG. 3 depicts a flow chart 300 for generating and outputting a composite image on a display of a vehicle, according to one or more embodiments described and illustrated herein.

In embodiments, in block 310, the processor 202 of the vehicle system 200 installed within the 102 may receive a first image from a first image capture component and a second image from a second image capture component. Both the first image capture component and the second image capture component may be external to the vehicle. It is noted that image capture components may be installed within apartment buildings, on the side of roadways, within other vehicles travelling alongside vehicle 100, and so forth. It is noted that at least one of the external components may be positioned at a height that is higher than the topmost portion of the vehicle 100 (e.g., roof of the vehicle 100). In embodiments, prior to receiving the first and second images, the processor 202 of the vehicle 100 may establish communication connections with various image capture components, each of which may be external to the vehicle 100. In embodiments, the communication connections may be established via the communication network 106 using one or more communication protocols, e.g., TCP/IP, UDP, etc. TCP/IP may enable the vehicle 100 to establish a secure connection between the vehicle system 200 of the vehicle and one or more image capture components 102, 104, 108. Alternatively, via UDP communication protocol, transmission and reception of data (e.g., image) without establishing a secure connection is contemplated. Other communication protocols comparable to TCP/IP and UDP are also contemplated.

In embodiments, in block 320, the processor 202 may generate a composite image using the first image and the second image. In embodiments, the first image may illustrate a first perspective view of the vehicle 100 and the second image may illustrate a second perspective view of the vehicle 100. In embodiments, the first perspective view may correspond to a view that is illustrative of the driver side of the vehicle 100, while the second perspective view may correspond to a view illustrative of the passenger side of the vehicle 100. Additionally, other images may be received from other external image capture components, which may be illustrative of the front and back of the vehicle 100. The processor 202 may analyze the subject matter of each received image and compare each image with one or more of the other images in order to identify similarities and differences between the various perspectives of vehicle 100. In embodiments, if the variation in perspectives corresponding to the images of the vehicle 100 is above a certain threshold, which may correspond to a particular minimum angle value, the processor 202 may combine images. However, if the variation in perspectives corresponding to images of the vehicle 100 is below a certain threshold, the processor 202 may not combine the images.

The combination of the images, which vary from each other by a certain minimum angle value, may then be utilized to generate the composite image. In embodiments, the composite image may correspond to an aerial view of the vehicle 100 such that it may correspond with a view of the vehicle 100 from a vertical position that is directly above the topmost portion of the vehicle 100. The vertical position is directly above the topmost portion of the vehicle. In other words, in embodiments, the composite image may illustrate a bird's eye view of the vehicle 100 from a certain vertical distance from the topmost portion of the vehicle 100.

In embodiments, in block 330, the processor 202 may output the generated composite image on a display of the vehicle 100. In embodiments, the composite image may be outputted on the display in real time. Additionally, in embodiments, the processor 202 may also be configured to display each individual image captured by a particular image capture component that is external to the vehicle 100. In this way, each image illustrative of a particular perspective view of the vehicle 100 may be output on the display of the vehicle 100 in response to a user selection of each individual image and/or an image capture component by, e.g., a user. Additionally, the processor 202 may be configured to display each image alongside one or more of the other images, automatically and without user intervention.

The analysis may involve extraction of image data of various images in order to identify contours, dimensions, and other characteristics associated with the vehicle 100. A variety of digital image recognition techniques may be utilized by the processor 202 to perform the analysis. A variety of machine learning based techniques are also contemplated.

Additionally, as stated, the composite image may enable vehicle operators to access and view one or more objects within a certain proximity of the vehicle 100, namely areas within a certain radius of the vehicle 100 such that any blind-spots in and around the vehicle 100 are identified. In this way, the likelihood of collisions between the vehicle 100 and other vehicles may be avoided. For example, in situations where the owner of the vehicle 100 drives into a street from a parking spot on the side of the street, the owner will be more aware of vehicles that travel adjacent to and through one or more blind spots of the vehicle 100. As such, the owner may be able to avoid collisions.

Figure 4:
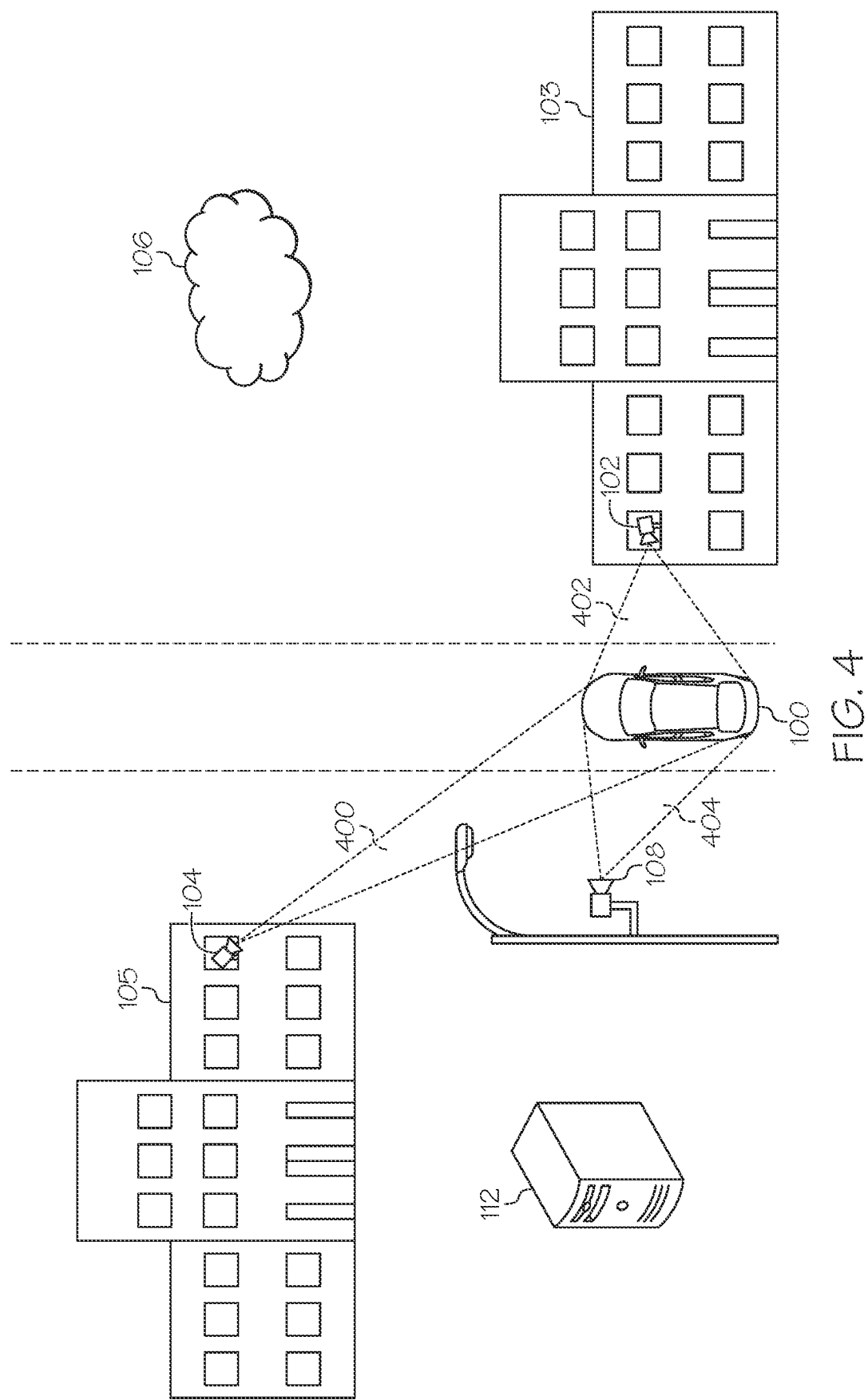
FIG. 4 schematically depicts an example operation of the composite image generating system of the present disclosure, according to one or more embodiments described and illustrated herein.

FIG. 4 schematically depicts an example operation of the composite image generating system of the present disclosure, according to one or more embodiments described and illustrated herein. Specifically, FIG. 4 depicts a vehicle 100 that is parked on a street adjacent to the image capture component 108 that may be mounted on a structure located on the side of the street. Additionally, image capture components 102, 104 may be positioned at heights that are higher than the topmost portion of the vehicle 100. For example, as depicted in FIGS. 1 and 4, the image capture components 102, 104 may be cameras that are positioned on a second floor window of buildings 103 and 105. In embodiments, the image capture components 102, 104 may be located at a height that is higher than the topmost portion of the vehicle 100 such that the image capture components 102, 104 may be pointed at a 45 degree angle downwards from the buildings 103, 105. Other positions and orientations of the image capture components are also contemplated.

In embodiments, the processor 202 of the vehicle 100 identify respective locations of various image capture components that are external to the vehicle 100. For example, the processor 202 may identify a first location of a first image capture component (e.g., image capture component 102) relative to the vehicle 100, a second location of a second image capture component (e.g., image capture component 104) relative to the vehicle 100, and a third location of a third image capture component (e.g., image capture component 108) relative to the vehicle 100. Additionally, in embodiments, the first and second locations of the image capture components may be associated with a height value that is higher than the topmost portion of the vehicle 100.

In embodiments, the image capture component 102 (e.g., first image capture component) may capture an image that illustrates a first perspective view of the vehicle 100, which may correspond to an image of the driver side and top portions of vehicle 100 from the second floor of the building 103. For example, the line of sight 402 of the image capture component 102 may include the vehicle 100, namely the passenger side portions of the vehicle 100, the top portion of the vehicle 100, and the rear portions of the vehicle 100. It is noted that one or more images may be captured. Alternatively or additionally, a live video stream of the vehicle 100 may be captured. In embodiments, these images may be captured based on the vehicle 100 being within the line of sight 402 of the image capture component 102.

In embodiments, the second image capture component (e.g., image capture component 104) may capture an image (within line of sight 400 of the image capture component 104) that illustrates a second perspective view of the vehicle 100, which may correspond to an image of the driver side portions, front portions, and top portions of vehicle 100 from the second floor of the building 105. It is noted that one or more images may be captured. Alternatively or additionally, a live video stream of the vehicle 100 may be captured. For example, the line of sight 404 may include the vehicle 100. In some embodiments, an additional image capture component (e.g., a third image capture component such as image capture component 108) may capture a third perspective image that illustrates a third perspective view of the vehicle 100, which may correspond to an image of the driver side portions of the vehicle 100. In embodiments, the image capture component 108 may be positioned at a location adjacent to the vehicle 100 such that the line of sight 404 of the image capture component 108 may include the driver side areas of the vehicle 100 from a short distance away (e.g., 5 feet to 10 feet) and from a height that is comparable to the height of the vehicle 100.

In some embodiments, the processor 202 may generate a composite image by combining the first image and the second image. Specifically, as the first image illustrates a first perspective view of the vehicle 100 (e.g., an image of passenger side, the top portions, and the rear portions of the vehicle 100) and the second image illustrates a second perspective view of the vehicle 100 (e.g., an image of the driver side, top portions, and front portions of the vehicle 100), the combination of these two images may result in a composite image that captures different perspectives of the vehicle 100 from a position that is a certain distance above the topmost portion of the vehicle 100. In other words, the composite image resembles a bird's eye view of the vehicle 100. Upon generation, the processor 202 may output the generated composite image on a display 216 of the vehicle 100. In embodiments, the generated composite image may be output on the display 216 in real time. Details regarding the manner in which the composite image is generated and displayed on the display 216 is described in greater detail in FIG. 5.

Figure 5:
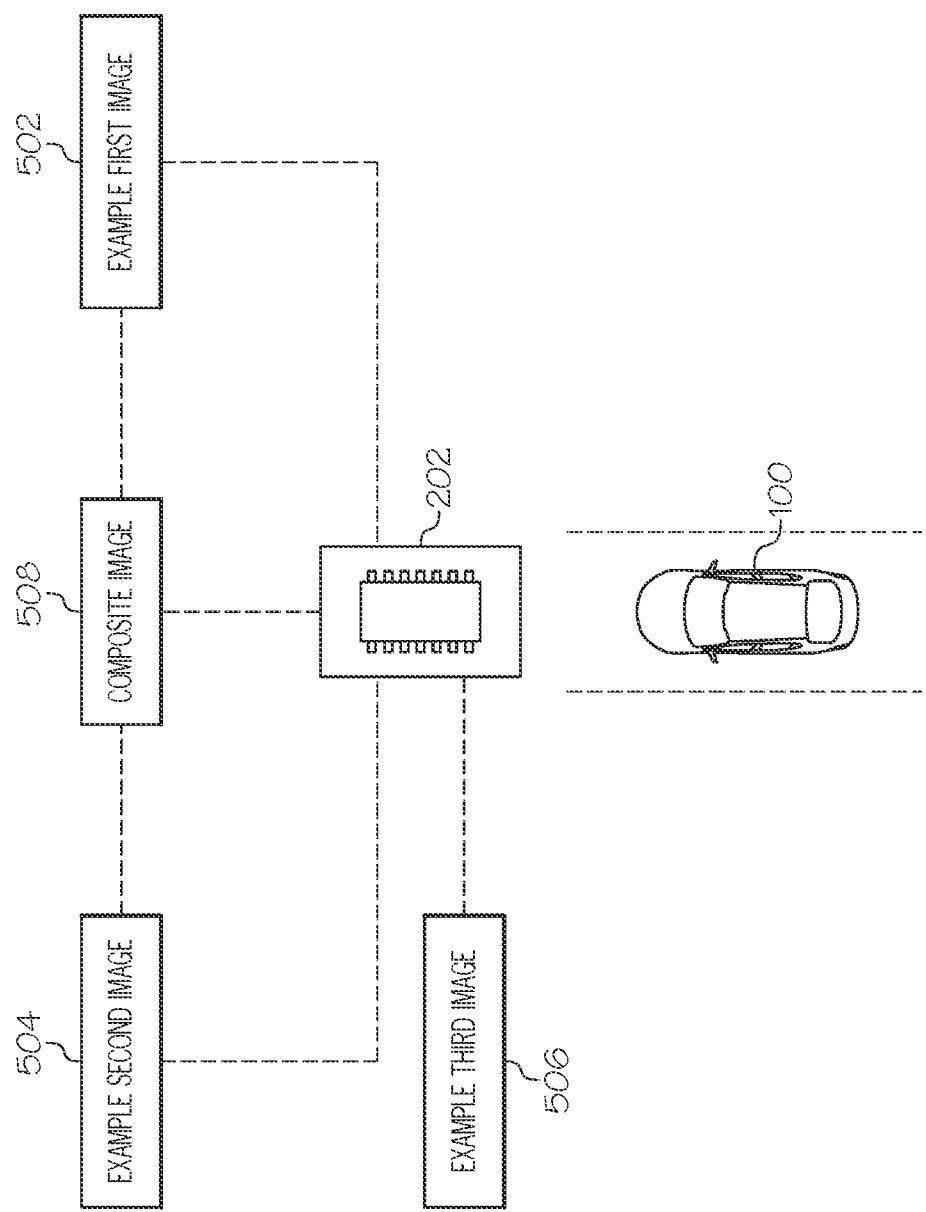
FIG. 5 illustrates another example operation of the composite image generating system of the present disclosure, according to one or more embodiments described and illustrated herein.

FIG. 5 illustrates another example operation of the composite image generating system of the present disclosure, according to one or more embodiments described and illustrated herein. It is noted that the subject matter of FIGS. 4 and 5 will be discussed interchangeably.

In an example operation, upon receiving first, second, and third images (e.g., first, second, and third example images), the processor 202 may analyze the content of each image and compare the content of these respective images. For example, an example first image 502 may correspond to the first image described in FIG. 4, which may be an image that includes the passenger side portions, the top portions, and the rear portions of the vehicle 100. Additionally, the example second and third images 504 and 506 may correspond to the second and third images described in FIG. 4, which may be an image that includes the driver side portions, front portions, and top portions of vehicle 100, and another image of the driver side portions of the vehicle 100 captured from a short distance away (e.g., 5 feet to 10 feet) and from a height that is comparable to the height of the vehicle 100. The example third image 506 may capture significant details of the vehicle 100 that may not have been captured in the example first and second images, as the third image was captured from an image capture component 108 that is located close to the vehicle 100. For example, the example third image may capture various details of the vehicle 100, e.g., contours, dimensions, and various other conditions related to the vehicle 100 (e.g., dents, finish of the vehicle 100, and so forth).

In embodiments, the processor 202 may analyze the content of each of the example first, second, and third images, and determine the extent of variations between these images. For example, the processor 202 may compare the angle of the example first image 502 relative to the example second image 504 to a threshold value and determine that these angles meet or exceed the threshold value. Additionally, the processor 202 may also determine that the orientation and position of each of the image capture components from which these images are captured also meets or exceeds the threshold value.

For example, the processor 202 may determine that the example first image 502 and the example second image 504 illustrate opposite sides of the vehicle 100. As such, the processor 202 may determine that these images are likely captured from image capture components 102, 104 positioned such that the difference in angles between their respective positions is higher than 90 degrees. It is further noted that the difference in the angles is reflected in the images of the vehicle. Additionally, in some embodiments, the threshold value may be set at an angle that is lower than 90 degrees. In other embodiments, the threshold value may also incorporate a difference in the resolution of a particular image, which may be a result of the distance from which a particular image capture component has captured the image of the vehicle 100. Other factors may also be contemplated.

If the processor 202 determines that the comparison of any two images does not meet certain criteria, e.g., fails to meet or exceed the threshold value, the processor 202 may not combine these two images. Specifically, in embodiments, the processor 202 may determine that if any two images fail to satisfy criteria specific to a particular threshold value, e.g., variation in angles associated with these images is less than the threshold value, the distance and the angular variation are less than a threshold value, these images may illustrate perspectives of the vehicle 100 that are substantially similar or identical. In other words, the processor 202 may determine that the two captured images include subject matter that is substantially similar or identical. For example, these images may both include the driver side and front portions of the vehicle 100 captured from 30 feet way from the vehicle, such that one image may have been captured by an image capture component that is on the second floor of the building 105 and another image may be captured from a third floor of the building 105.

As such, the differences in the content of the two images, namely perspectives illustrated in the two images, are small. The processor 202 may then determine that combining both of these images in generating the composite image may not be useful. In contrast, if two images do satisfy a particular threshold value, e.g., variation in angles associated with these images is greater than the threshold value, these images may have captured perspectives of the vehicle 100 that sufficiently different to justify combining these images for generating a composite image. For example, these images may include driver side and front portions of the vehicle 100 captured from 30 feet away from the vehicle, and passenger side and rear portions of the vehicle 100 captured from 30 feet away from the vehicle. As such, these images are captured from image capture components that may be positioned at diametrically opposite locations from one another, and thereby, capture images corresponding to perspectives of the vehicle 100 that are sufficiently different from each other.

Returning to FIG. 5, upon analyzing the contents of the example first image 502, second image 504, and third image 506, the processor 202 may determine that there are sufficient variations between the example first, second, and third images 502, 504, 506 (e.g., differences in angles associated with these images, distances from which these images are captured, and so forth). Based on these differences, the example first, second, and third images 502, 504, 506 may be combined to generate the composite image 508. Thereafter, the generated composite image 508 may be output on the display 216 of the vehicle system 200 in real time.

In embodiments, it is further noted all images that are received by the vehicle system 200 from one or more external image capture components, may be individually displayed as part of the display 216. For example, a user may interact with one or more buttons positioned in the interior of the vehicle 100 or interact with one or more icons displayed on the display 216, in response to which a particular image captured by a particular external image capture component may be display on the display 216. In embodiments, the icons may be labeled "First Image Capture Component", "Second Image Capture Component", "Third Image Capture Component", and so forth. Upon receiving a selection of an icon corresponding to a particular image capture component, one or more images captured by the image capture component that corresponds to the selected icon may be displayed on the display 216 of the vehicle 100. In embodiments, the images captured by the image capture components may be displayed simultaneously on the display 216. A plurality of other permutations and combinations of displaying images on the display 216 are also contemplated.

FIG. 6 depicts examples of composite images that may be generated by the processor, according to one or more embodiments described and illustrated herein. Specifically, FIG. 6 depicts an example composite image 602 that may be generated by the processor 202, which combines images from multiple image capture components. Each of these images may illustrate varying perspectives. As illustrated in FIG. 6, an example aerial perspective view of the vehicle 100 is illustrated. Specifically, this view is associated with a vertical position that is higher than a topmost portion of the vehicle 100. Such a vertical position is directly above the topmost portion of the vehicle 100. In this way, a bird's eye view of the vehicle 100 may be generated and output onto a display 216 of the vehicle 100. Such a view enables vehicle operators to quickly and effectively identify blind spots in and around the vehicle 100, which enables these operators to avoid collisions.

Figure 7:
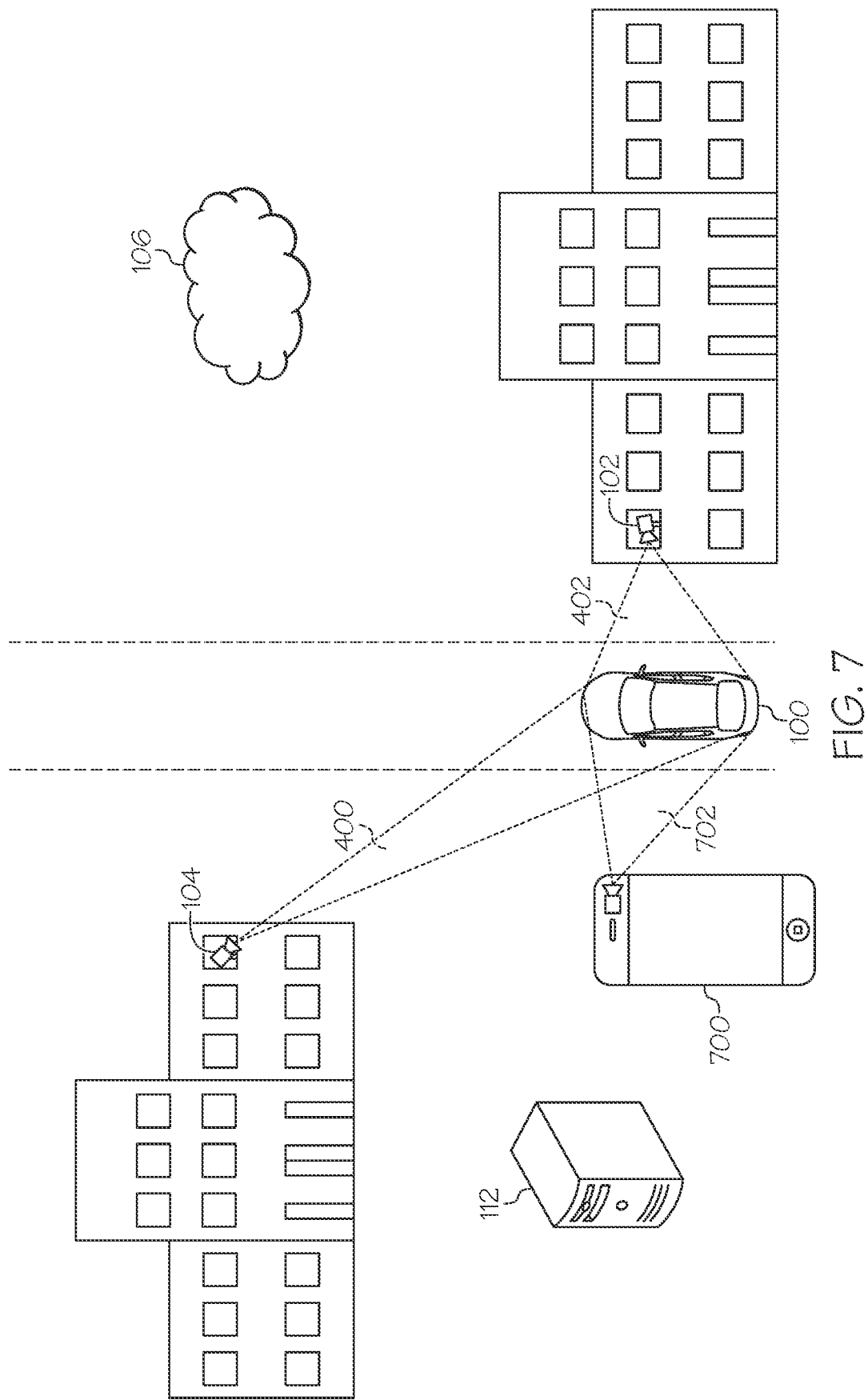
FIG. 7 depicts another example operation of the composite image generating system of the present disclosure that involves use of a mobile device, according to one or more embodiments described and illustrated herein.

FIG. 7 depicts another example operation of the composite image generating system of the present disclosure, according to one or more embodiments described and illustrated herein. Specifically, FIG. 7 depicts an example operation of the composite image generating system that is similar to the example operation depicted in FIG. 4. However, in the example operation depicted in FIG. 7, in contrast with FIG. 4, an image capture component that is part of a user's mobile device 700 may be utilized to capture images based on a flexible angle view. Specifically, the flexible angle view or flexible angle perspective view (e.g., free angle view) of the vehicle 100 may be captured from a user that points a camera of his mobile device 700 at any angle of his choosing in order to capture images of the vehicle from angles that may be inaccessible from rigidly poisoned image capture components. It is noted that the functionality of the image capture components 102 and 104 in the example operation depicted in FIG. 7 is comparable to the operation depicted in FIG. 4 and described in the present disclosure.

In embodiments, the processor 202 may receive one or more images that are captured by an image capture component of the mobile device 700. For example, a user approach the vehicle 100 and position a camera of the mobile device 700 on and along the drive side portions of the vehicle 100. In embodiments, the user of the mobile device 700 may capture a live video stream and walk along various portions of the vehicle 100, from the area near the trunk of the vehicle 100 to the front hood of the vehicle. Alternatively, the user may capture multiple images of the vehicle 100 as the user walks from the trunk of the vehicle 100 to the front hood of the vehicle. Alternatively, a user may stretch his hand over the top portion of the vehicle 100, e.g., the roof of the vehicle 100. These images may be transmitted to the vehicle system 200. Upon receipt, the received images may be routed to the processor 202 via the communication path 204. The line of sight 702 of the mobile device 700 illustrates a flexible angle perspective view from which an image of the vehicle 100 may be captured. Additionally, the image capture components 102, 104 may capture additional images of the vehicle 100, which may appear within the line of sights 402, 400 respectively, as described in detail above.

Thereafter, the content of these images may be compared with the content of one or more images that are received from other image capture components (e.g., image capture components 102, 104) in the manner described above, e.g., variations in the content of these images may be determined based on comparing the content with a threshold value. Specifically, as stated, the threshold value may relate to a variation in angles associated with the various images received from the image capture components, which are based on the positioning of the image capture components relative to the vehicle 100, the distances away from the vehicle 100 from which these images were captured, and so forth. Based on the comparison, the processor 202 may combine various images to generate a composite image, e.g., an example of which is depicted in FIG. 6.

It should be understood that the embodiments described herein relate to a method for generating and outputting composite images on displays of vehicles. The method includes receiving a first image from a first image capture component external to the vehicle and a second image from a second image capture component that is external to the vehicle, generating a composite image using the first image and the second image, the first image illustrating a first perspective view of the vehicle and the second image illustrating a second perspective view of the vehicle, and outputting the composite image on a display of the vehicle.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a processor configured to:
        receive a first image from a first image capture component and a second image from a second image capture component;
        generate a composite image using the first image and the second image, the first image illustrating a first perspective view of the vehicle and corresponding to a first perspective angle and the second image illustrating a second perspective view of the vehicle and corresponding to a second perspective angle, the generating including:
            comparing the first perspective angle associated with the first image and the second perspective angle associated with the second image, and
            combining the first image and the second image in response to determining that the first perspective angle varies from the second perspective angle by a threshold value; and
        output the composite image on a display of the vehicle.

2. The vehicle of claim 1, wherein the processor is configured to output the composite image on the display of the vehicle in real time.

3. The vehicle of claim 1, wherein the processor is further configured to identify a first location of the first image capture component relative to the vehicle and a second location of the second image capture component relative to the vehicle.

4. The vehicle of claim 1, wherein the processor is further configured to:
    receive a selection of one of the first image capture component and the second image capture component; and
    output an image from the selected one of the first image capture component and the second image capture component on the display of the vehicle.

5. The vehicle of claim 3, wherein the first location is associated with a height value that is higher than a topmost portion of the vehicle.

6. The vehicle of claim 1, wherein the first image capture component and the second image capture component are cameras.

7. The vehicle of claim 1, wherein the composite image is associated with an aerial perspective view of the vehicle associated with a vertical position that is higher than a topmost portion of the vehicle.

8. The vehicle of claim 7, wherein the vertical position is directly above the topmost portion of the vehicle.

9. The vehicle of claim 1, therein the processor is further configured to:
    receive a third image from a mobile device, the third image corresponding to a flexible angle view of the vehicle; and
    combine the third image with the combination of the first image and the second image.

10. A method implemented by a processor of a vehicle, the method comprising:
    receiving a first image from a first image capture component and a second image from a second image capture component;
    generating a composite image using the first image and the second image, the first image illustrating a first perspective view of the vehicle and corresponding to a first perspective angle and the second image illustrating a second perspective view of the vehicle and corresponding to a second perspective angle, the generating including:
        comparing the first perspective angle associated with the first image and the second perspective angle associated with the second image, and
        combining the first image and the second image in response to determining that the first perspective angle varies from the second perspective angle by a threshold value; and
    outputting the composite image on a display of the vehicle.

11. The method of claim 10, wherein the outputting of the composite image on the display is in real time.

12. The method of claim 10, further comprising identifying a first location of the first image capture component relative to the vehicle and a second location of the second image capture component relative to the vehicle.

13. The method of claim 12, wherein the first location is associated with a height that is higher than a topmost portion of the vehicle.

14. The method of claim 10, wherein the first image capture component and the second image capture component are cameras.

15. The method of claim 10, wherein the composite image is associated with an aerial perspective view of the vehicle associated with a vertical position that is higher than a topmost portion of the vehicle, the vertical position is directly above the topmost portion of the vehicle.

16. The method of claim 10, further comprising:
    receiving a third image from a mobile device, the third image corresponding to a flexible angle view of the vehicle; and
    combining the third image with the combination of the first image and the second image.

17. A system comprising:
    a first image capture component and a second image capture component;
    the vehicle including a processor that is configured to:
        receive a first image from the first image capture component and a second image from the second image capture component;
        generate a composite image using the first image and the second image, the first image illustrating a first perspective view of the vehicle and corresponding to a first perspective angle and the second image illustrating a second perspective view of the vehicle and corresponding to a second perspective angle, the generating including:
  comparing the first perspective angle associated with the first image and the second perspective angle associated with the second image, and
  combining the first image and the second image in response to determining that the first perspective angle varies from the second perspective angle by a threshold value; and
output the composite image on a display of the vehicle.

18. The system of claim 17, wherein the composite image is associated with an aerial perspective view of the vehicle associated with a vertical position that is higher than a topmost portion of the vehicle.

\* \* \* \* \*

UNITED STATES PATENT AND TRADEMARK OFFICE
CERTIFICATE OF CORRECTION

PATENT NO. : 11,351,932 B1
APPLICATION NO. : 17/155774
DATED : June 7, 2022
INVENTOR(S) : Masashi Nakagawa It is certified that error appears in the above-identified patent and that said Letters Patent is hereby corrected as shown below:

In the Claims

In Column 14, Line(s) 5, Claim 9, delete "therein" and insert --wherein--, therefor.

Signed and Sealed this
Twenty-third Day of August, 2022

Katherine Kelly Vidal
*Director of the United States Patent and Trademark Office*